(12) United States Patent
Krallman et al.

(10) Patent No.: US 9,462,568 B2
(45) Date of Patent: Oct. 4, 2016

(54) SYSTEMS AND METHODS FOR INDOOR LOCATION SERVICES

(71) Applicant: Retail Optimization International, Inc., Miami Beach, FL (US)

(72) Inventors: Charles William Krallman, Beef Island (VG); Adam J. Fleming, Cheadle Hulme (GB); Ian Andrew Woods, Liverpool (GB)

(73) Assignee: Retail Optimization International, Inc., Miami Beach, FL (US)

( * ) Notice: Subject to any disclaimer, the term of this patent is extended or adjusted under 35 U.S.C. 154(b) by 179 days.

(21) Appl. No.: 14/209,939

(22) Filed: Mar. 13, 2014

(65) Prior Publication Data
US 2016/0021636 A1    Jan. 21, 2016

Related U.S. Application Data

(60) Provisional application No. 61/779,458, filed on Mar. 13, 2013.

(51) Int. Cl.
*H04W 24/00* (2009.01)
*H04W 64/00* (2009.01)

(52) U.S. Cl.
CPC .................................. *H04W 64/00* (2013.01)

(58) Field of Classification Search
CPC  H04L 29/08108; H04W 4/02; H04W 64/00; H04W 48/04
USPC ...................... 455/414.1–414.4, 456.1–456.6
See application file for complete search history.

(56) References Cited

U.S. PATENT DOCUMENTS

| | | | | |
|---|---|---|---|---|
| 6,140,964 A * | 10/2000 | Sugiura | ................... | G01S 1/026 342/360 |
| 8,990,043 B1 * | 3/2015 | Kolodziej | ................ | G01O 5/06 455/404.2 |
| 2007/0099633 A1 * | 5/2007 | Bamberger | ........... | H04W 64/00 455/456.2 |
| 2008/0076430 A1 * | 3/2008 | Olson | ................... | H04W 36/32 455/440 |
| 2012/0253674 A1 * | 10/2012 | Kamiwada | ........... | G01C 21/206 702/3 |
| 2013/0179074 A1 * | 7/2013 | Haverinen | ............. | G01C 21/08 701/525 |
| 2013/0219437 A1 * | 8/2013 | Ban | ........................ | G06Q 30/02 725/81 |
| 2013/0336093 A1 * | 12/2013 | Suvanto | .................. | G01S 15/06 367/99 |
| 2014/0046624 A1 * | 2/2014 | Miettinen | ................. | G01S 1/70 702/150 |
| 2014/0111380 A1 | 4/2014 | Gibbs et al. | | |
| 2014/0128105 A1 | 5/2014 | Su et al. | | |
| 2014/0149562 A1 * | 5/2014 | Xiao | ................... | H04L 41/0879 709/222 |

(Continued)

FOREIGN PATENT DOCUMENTS

WO    WO 2014/120468    8/2014

OTHER PUBLICATIONS

International Search Report and Written Opinion dated Mar. 23, 2016 for PCT/US2015/054552 filed Oct. 7, 2015, 12 pages.

*Primary Examiner* — Christopher M Brandt
*Assistant Examiner* — Matthew Genack
(74) *Attorney, Agent, or Firm* — Ropes & Gray LLP

(57) ABSTRACT

Many indoor location services do not require precise knowledge of the position of a mobile device, but simply whether a mobile device is within a particular zone of an indoor area. Existing signals in an indoor space may provide enough information to distinguish between different zones of an indoor area, allowing a server to provide indoor location services without requiring the installation of new signal sources in the indoor area.

40 Claims, 15 Drawing Sheets

(56) References Cited

U.S. PATENT DOCUMENTS

2014/0218241 A1* 8/2014 Bernhardt ............. G01S 5/0236
342/451

2014/0229818 A1* 8/2014 Goswami ............ G06F 17/2247
715/234

* cited by examiner

SYSTEMS AND METHODS FOR INDOOR LOCATION SERVICES

CROSS-REFERENCE TO RELATED APPLICATIONS

This application claims priority to U.S. Provisional Application Ser. No. 61/779,458, filed on Mar. 13, 2013, entitled "Systems and Methods for Indoor Location Services," the entire contents of which are hereby incorporated by reference.

INTRODUCTION

A user's location within an indoor space may be important to the user, retailers, manufacturer brands, advertisers, or others. Accurate indoor location services allow contextual messages, Web pages, coupons, surveys, video clips, and other kinds of content to be delivered to customers' mobile devices based on where they are in a building. But the Global Positioning System (GPS) location services that provide accurate positioning information outside are less accurate indoors.

Consequently, many companies are attempting to provide precise indoor location solutions, and have proposed technologies relying variously on magnetic field detection, WI-FI signals, BLUETOOTH signals, audio beacons, and more. Generally, the more accurate the position, the greater is the need to add enabling hardware infrastructure to the indoor space. The high cost of equipment installation and maintenance and the associated costs and interruption to business caused by refitting these systems in existing spaces has been a substantial barrier to adoption. Also, many systems are not consistently accurate, and many do not work consistently across all mobile platforms.

SUMMARY

There is therefore a need for improved indoor location services. It is a realization of the inventor that most classes of the mobile-based interior location problem do not require identifying a free-space location of the mobile device, but only distinguishing between a plurality of zones comprising an indoor area. As illustrative examples, a store providing coupons to visitors to a particular department and a museum providing visitors information regarding a particular gallery do not need to know the precise longitude, latitude, and altitude of their visitors' smartphones or tablet computers, but only whether their mobile devices are in a particular zone. Identifying whether a mobile device is within a particular zone may be determined with high accuracy without requiring extensive equipment installation and calibration. Accordingly, the systems and methods described herein relate to identifying whether a mobile device is located within a predetermined zone of an indoor area.

In certain aspects, the systems and methods described herein relate to identifying an indoor location of a mobile device. A communication processor may receive a measurement from a mobile device in an indoor area and identify the type of the mobile device from which the measurement was received. In some implementations, the measurement may include one or more of a GPS measurement, a BLUETOOTH signal strength, a WI-FI signal strength, a cellular tower signal strength, a local magnetic field strength, a local magnetic field direction, an ambient light intensity, the intensity of sound of a predetermined frequency, a time, or other suitable measurements. A location processor may identify the indoor area, in some implementations based on GPS data, cellular signal data, or by the user running an application associated with the indoor area. The indoor area may have a plurality of zones, and a location database may associate each zone of the plurality of zones with a corresponding measurement range of a plurality of measurement ranges. Each measurement range of the plurality of measurement ranges may be associated with a type of mobile device. The location processor may identify a zone in which the mobile device is located based on the type of the mobile device, the measurement received from the mobile device, and the information associating the zone with the corresponding measurement range. The identified zone is one of the plurality of zones comprising the indoor area. In some implementations, the communication processor may also provide content to the mobile device based on the zone in which the mobile device is located.

In some implementations, the communication processor receives a plurality of test measurement packages. A test measurement package identifies a type of mobile device, a zone of the plurality of zones, and a measurement. In such implementations, the location processor may modify the information stored in the location database based on the plurality of measurement packages. The test measurement package may be a measurement associated with a zone-specific code and is received from the identified type of mobile device. The information associating each zone of the plurality of networks may be a model associating each zone of the plurality of zones with a corresponding measurement range associated with the type of mobile device. In some such implementations, the model may be a neural network.

BRIEF DESCRIPTION OF THE DRAWINGS

The systems and methods described herein are set forth in the appended embodiments. However, for the purpose of explanation, several implementations are set forth in the following figures.

DETAILED DESCRIPTION

In the following description, numerous details are set forth for the purpose of explanation. However, one of ordinary skill in the art will realize that the implementations described herein may be practiced without the use of these specific details and that the implementations described herein may be modified, supplemented, or otherwise altered without departing from the scope of the invention.

Figure 1A:
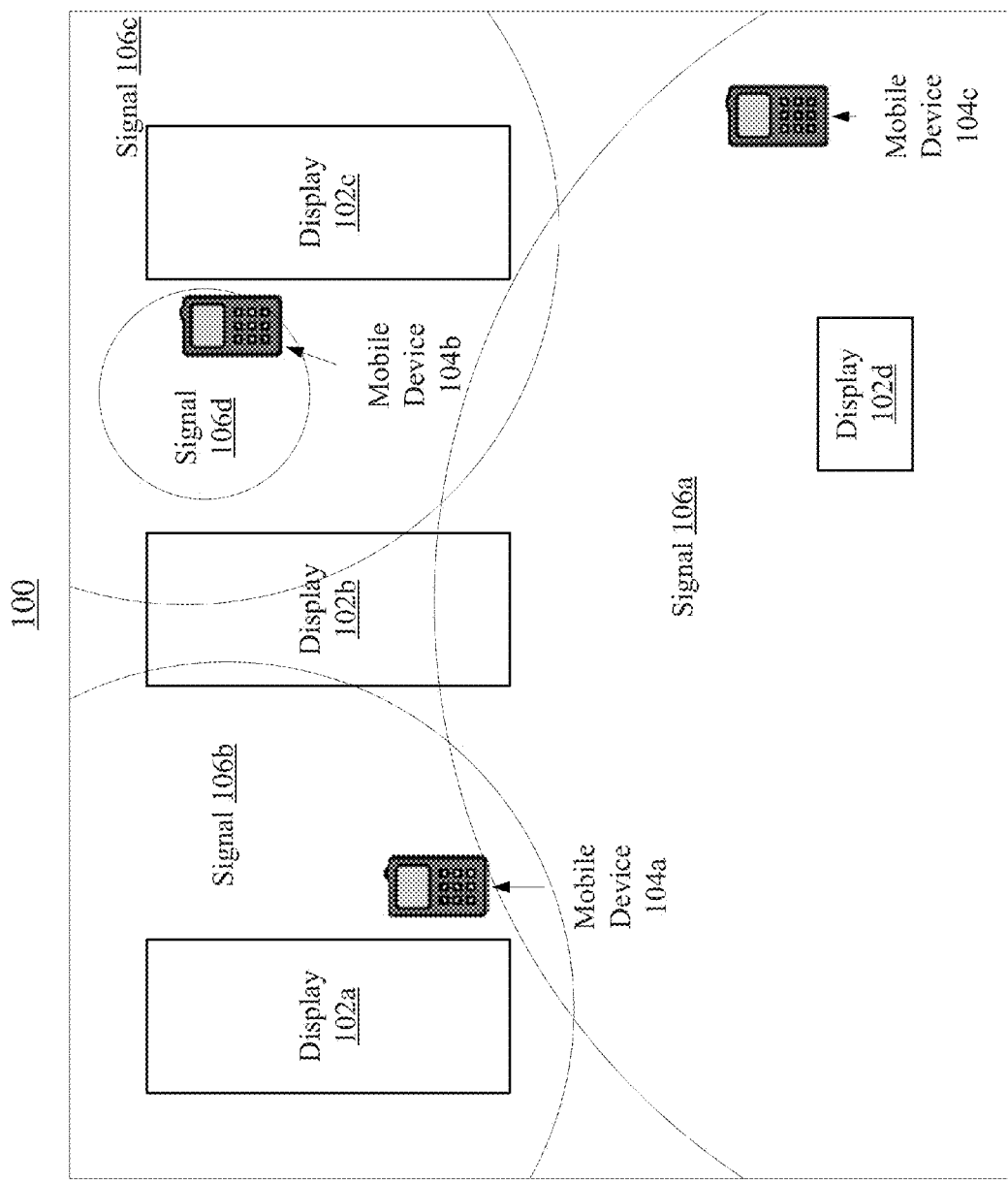
FIG. 1A is a block diagram of an indoor area with varying signals, according to an illustrative implementation.
Figure 1B:
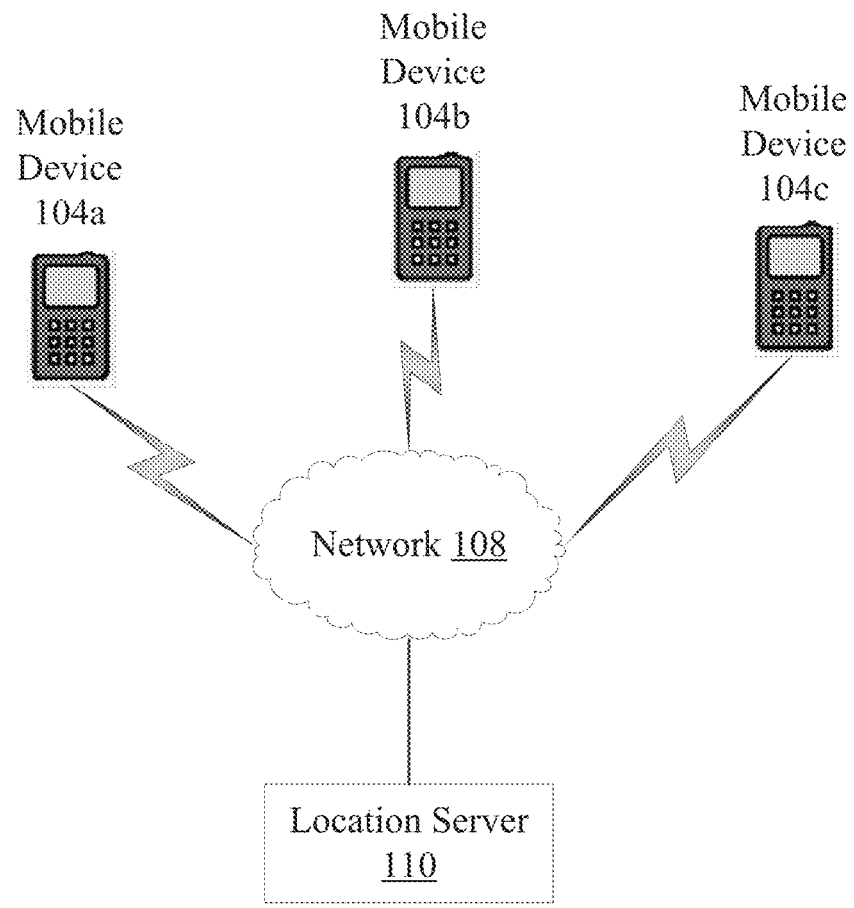
FIG. 1B is a block diagram of an indoor location service, according to an illustrative implementation.
Figure 1C:
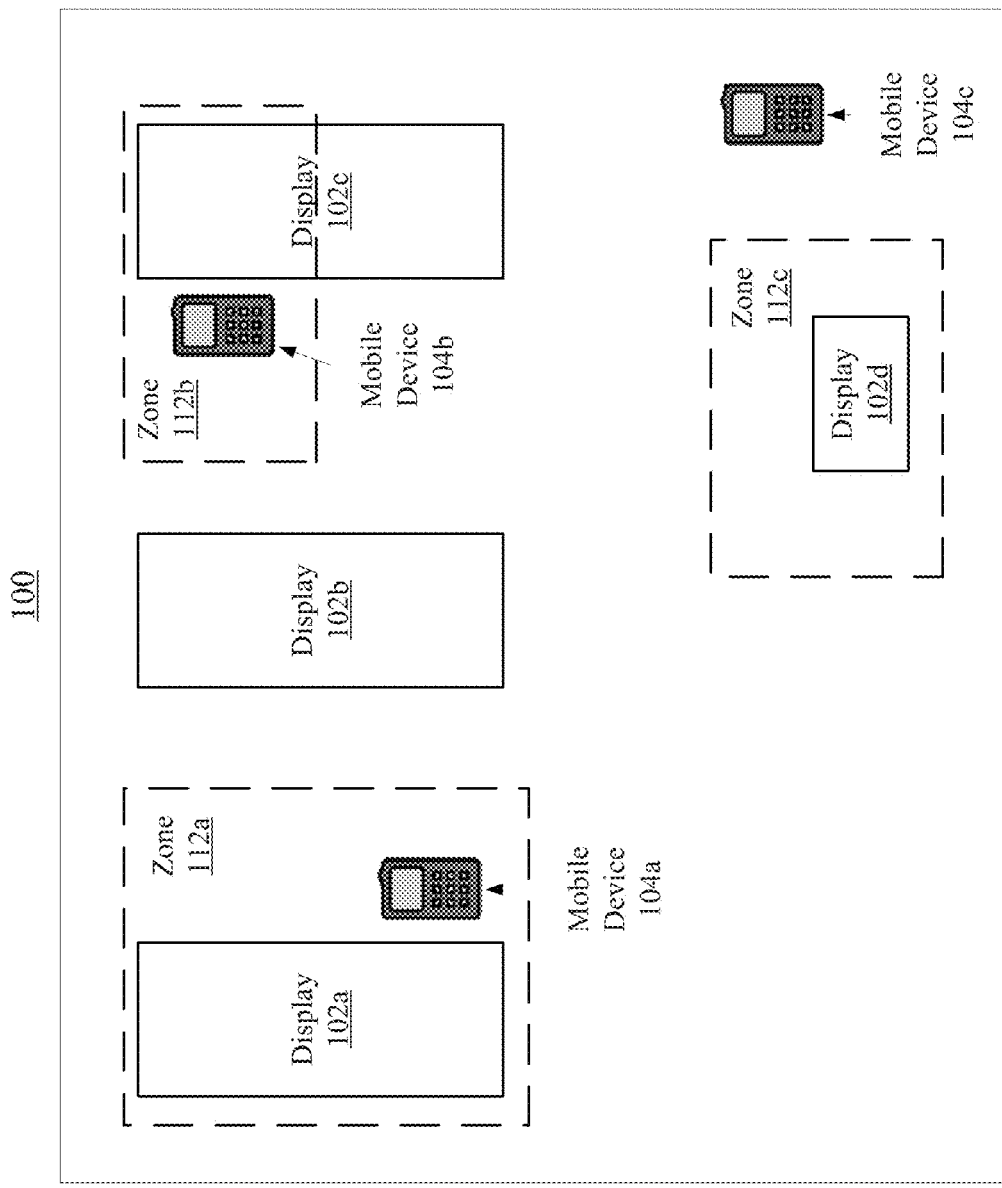
FIG. 1C is a block diagram of an indoor area with locational zones, according to an illustrative implementation.
Figure 2A:
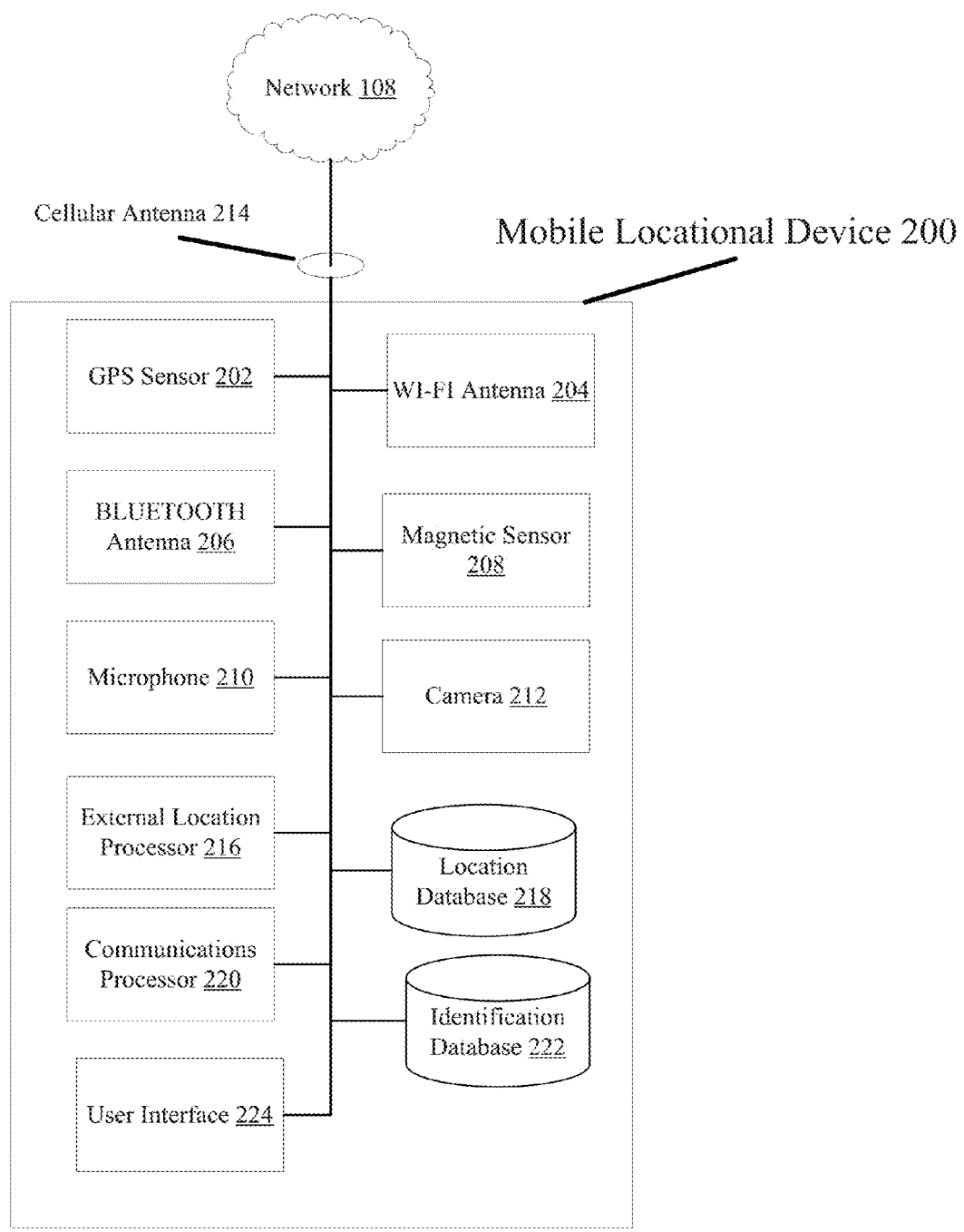
FIG. 2A is a block diagram of a mobile locational device, according to an illustrative implementation.
Figure 2B:
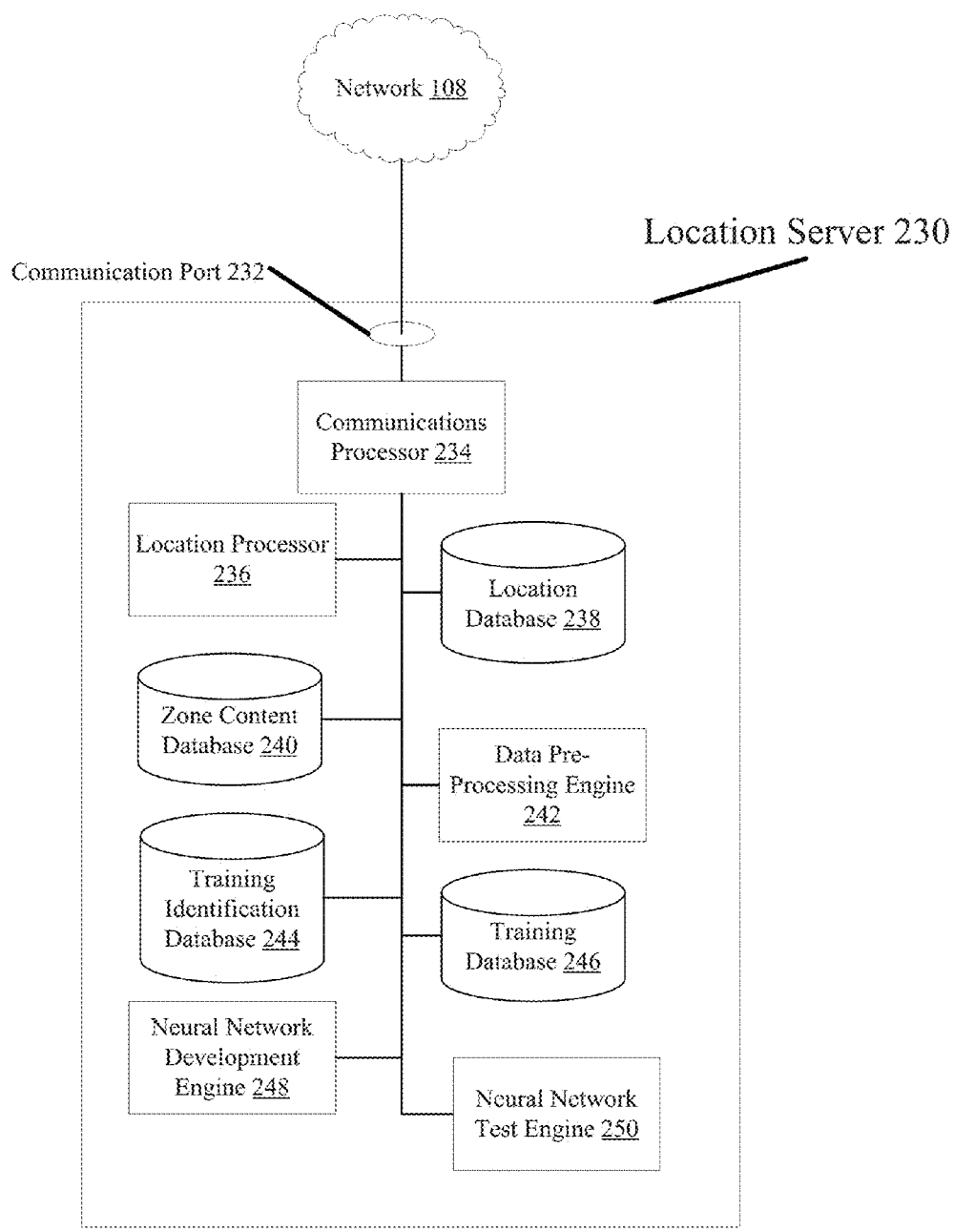
FIG. 2B is a block diagram of a indoor location server, according to an illustrative implementation.
Figure 3:
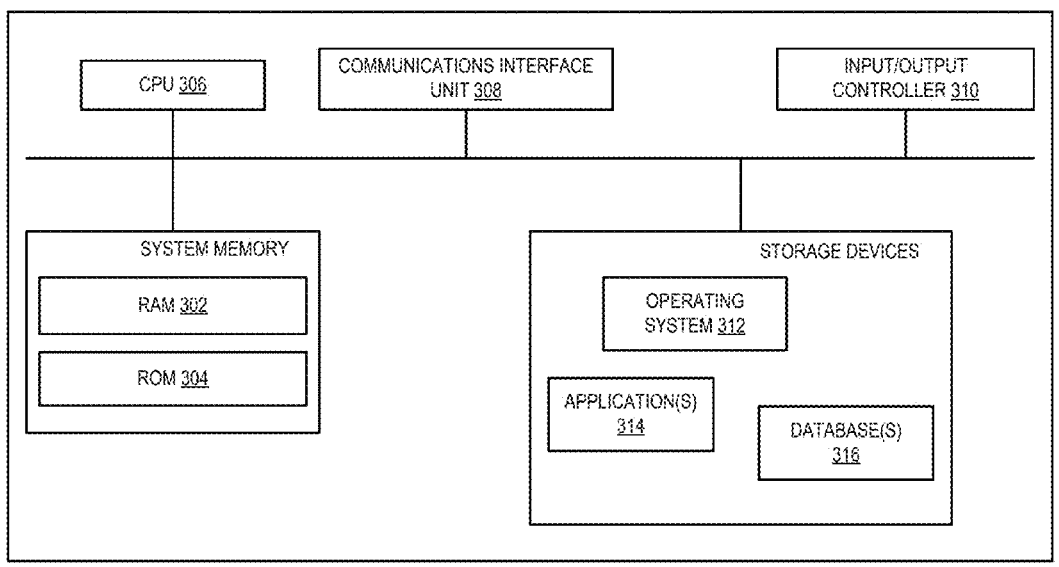
FIG. 3 is a block diagram of a computing device for performing any of the processes described herein.
Figure 4A:
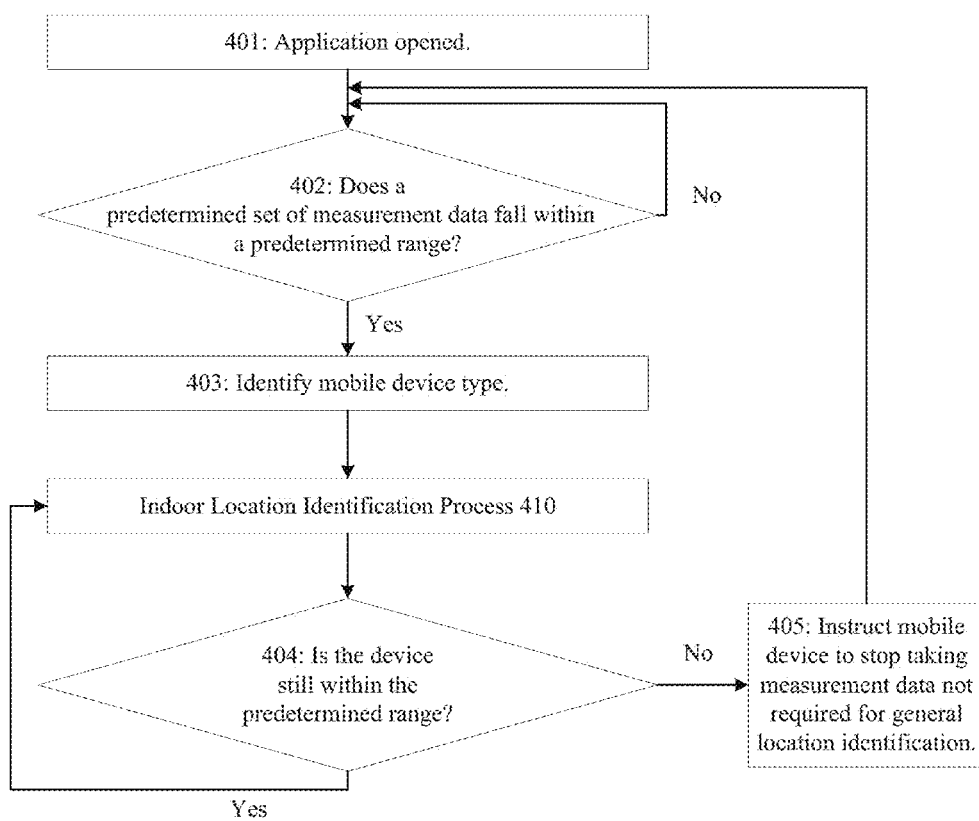
FIG. 4A is a flow chart of a process for identifying whether a mobile device is in a classifiable indoor area, according to an illustrative implementation.
Figure 4B:
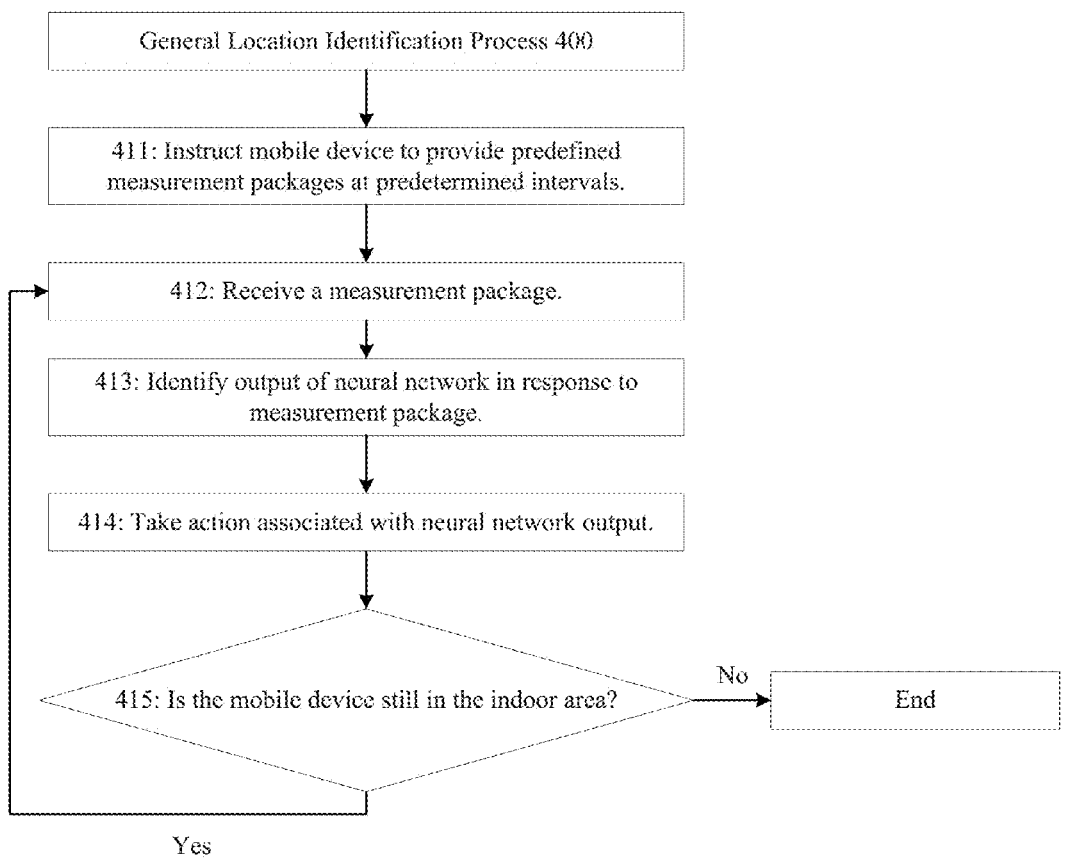
FIG. 4B is a flow chart of a process for classifying the position of a mobile device, according to an illustrative implementation.
Figure 4C:
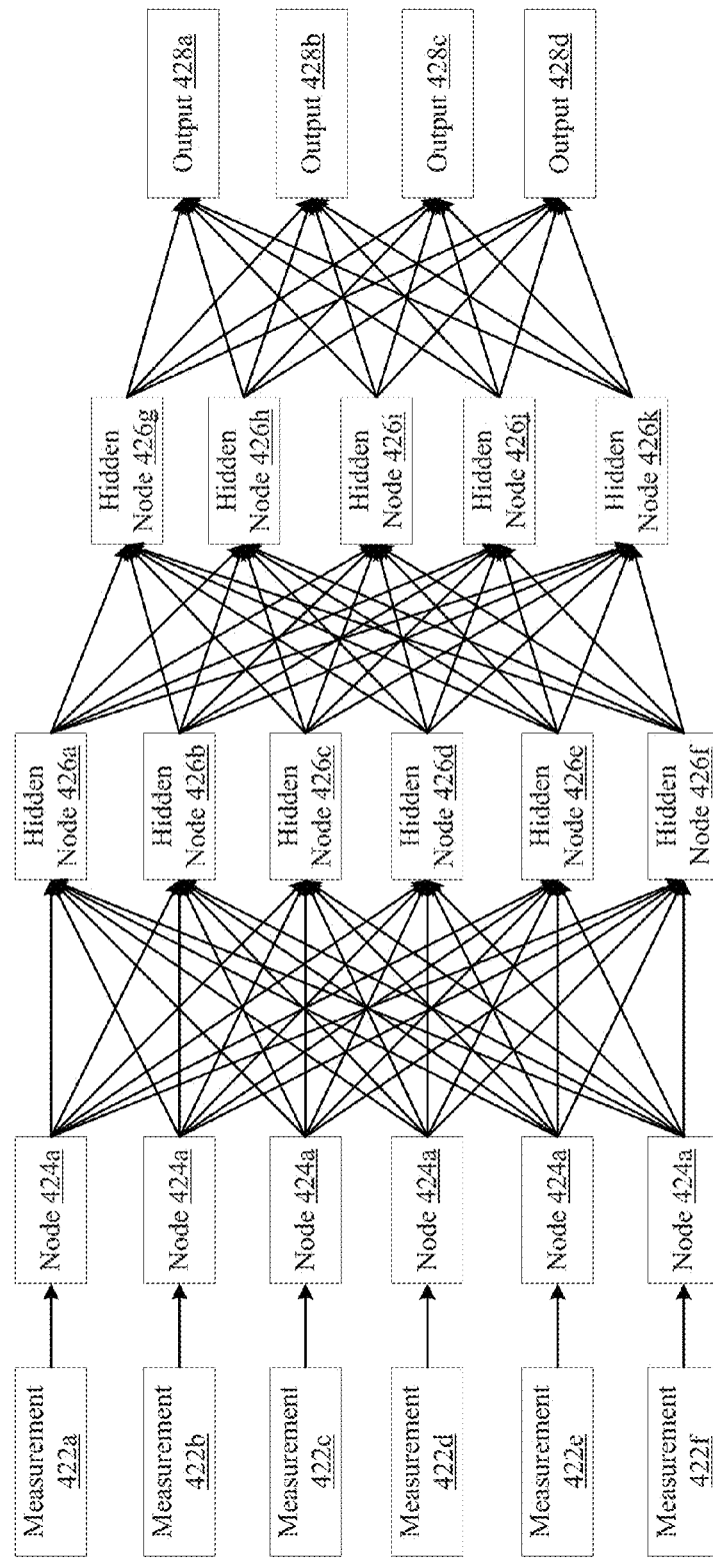
FIG. 4C depicts an exemplary neural network for classifying an indoor location.
Figure 5A:
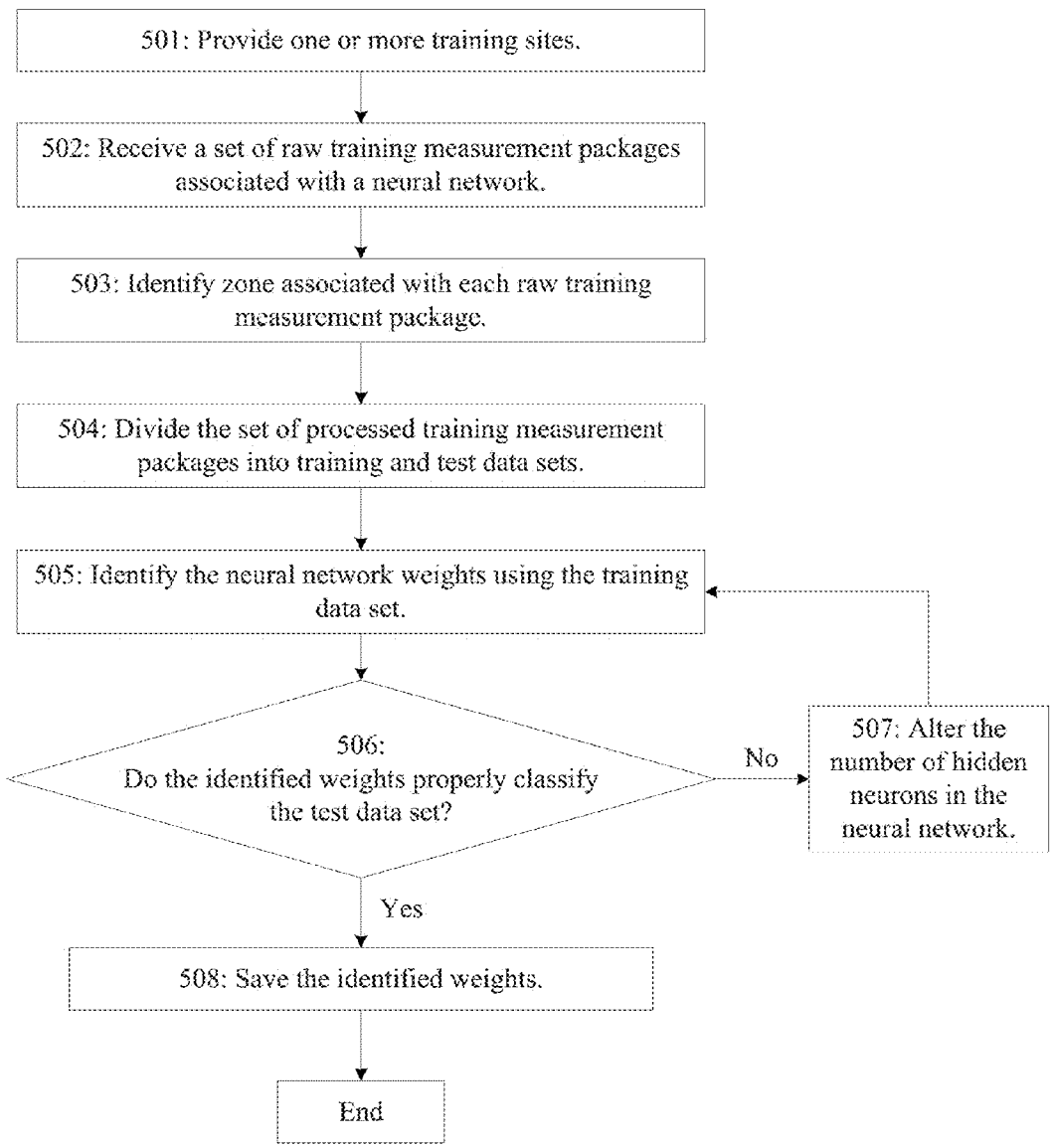
FIG. 5A is a flow chart of a process for training a neural network to identify an indoor location based on available measurement data, according to an illustrative implementation.
Figure 5B:
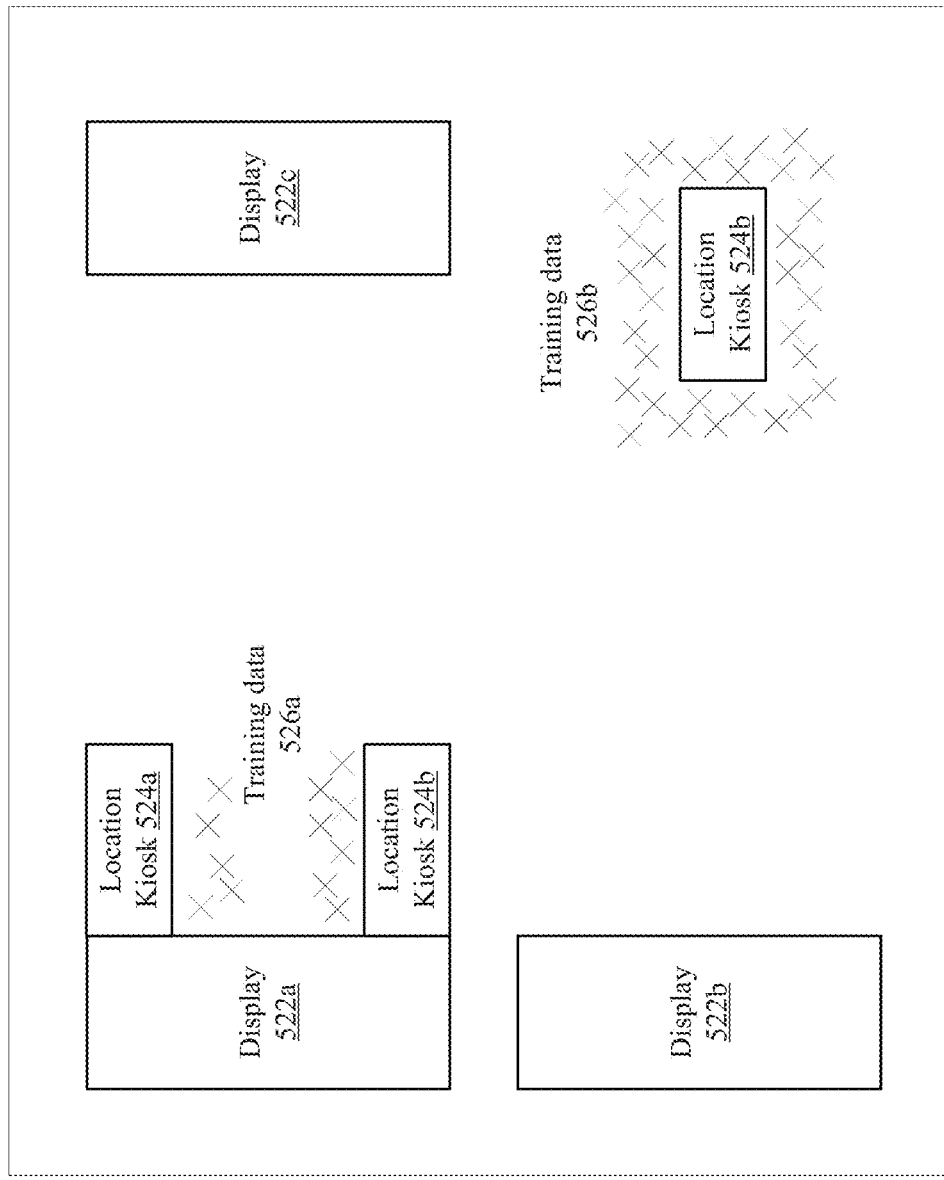
FIG. 5B is a block diagram of an indoor area with training sites to generate training data for a location classifying neural network, according to an illustrative implementation.
Figure 6A:
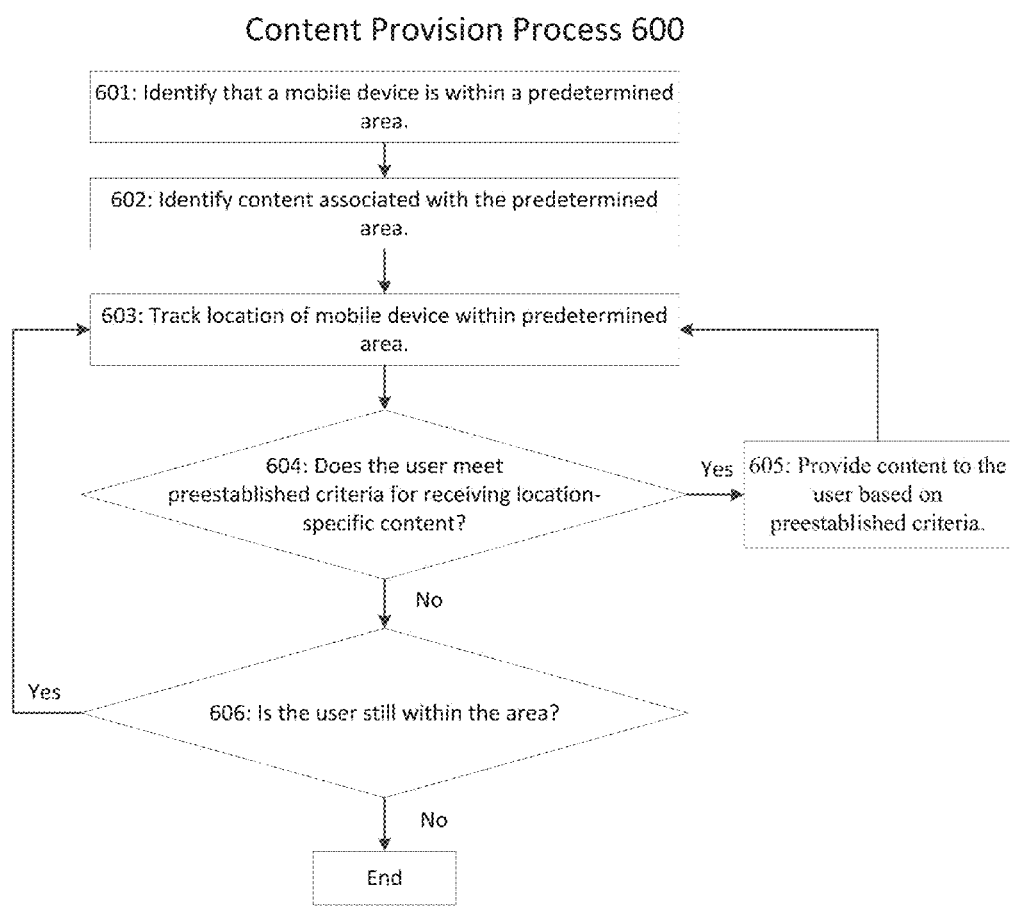
FIG. 6A is a flow chart of a process for providing content associated with a predetermined area, according to an illustrative implementation.
Figure 6B:
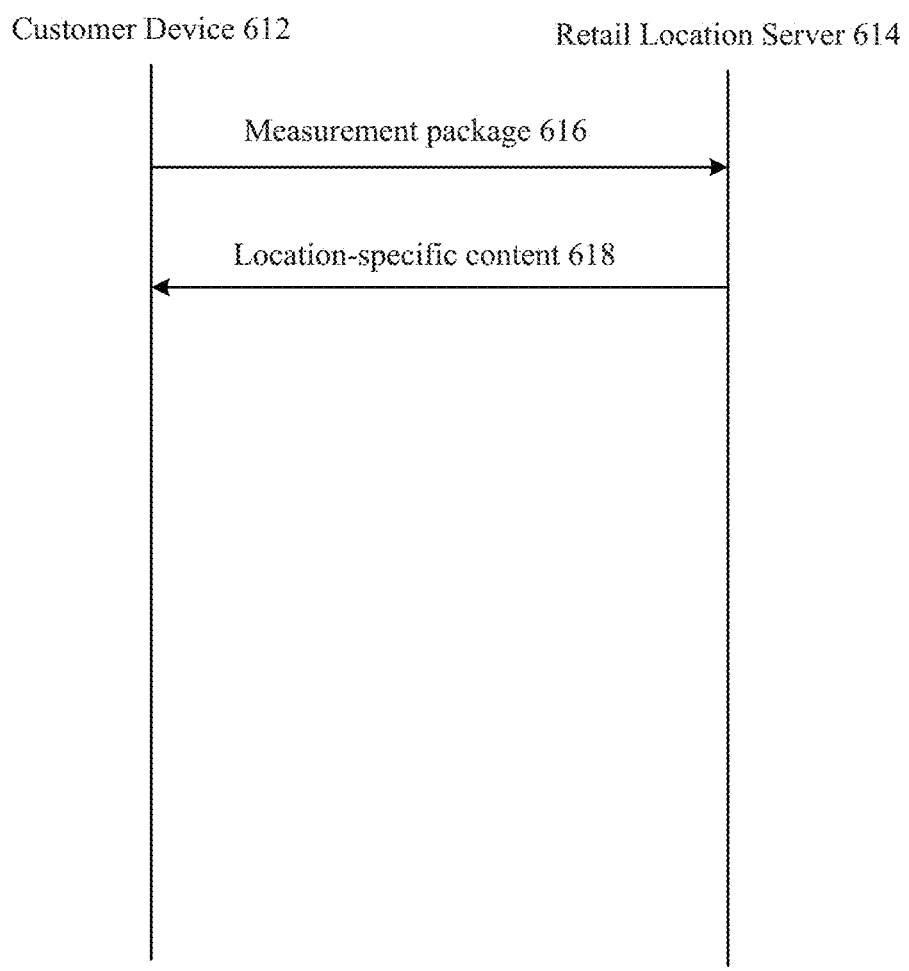
FIG. 6B is an exemplary process diagram depicting a retailer providing content associated with a predetermined area, according to an illustrative implementation.
Figure 6C:
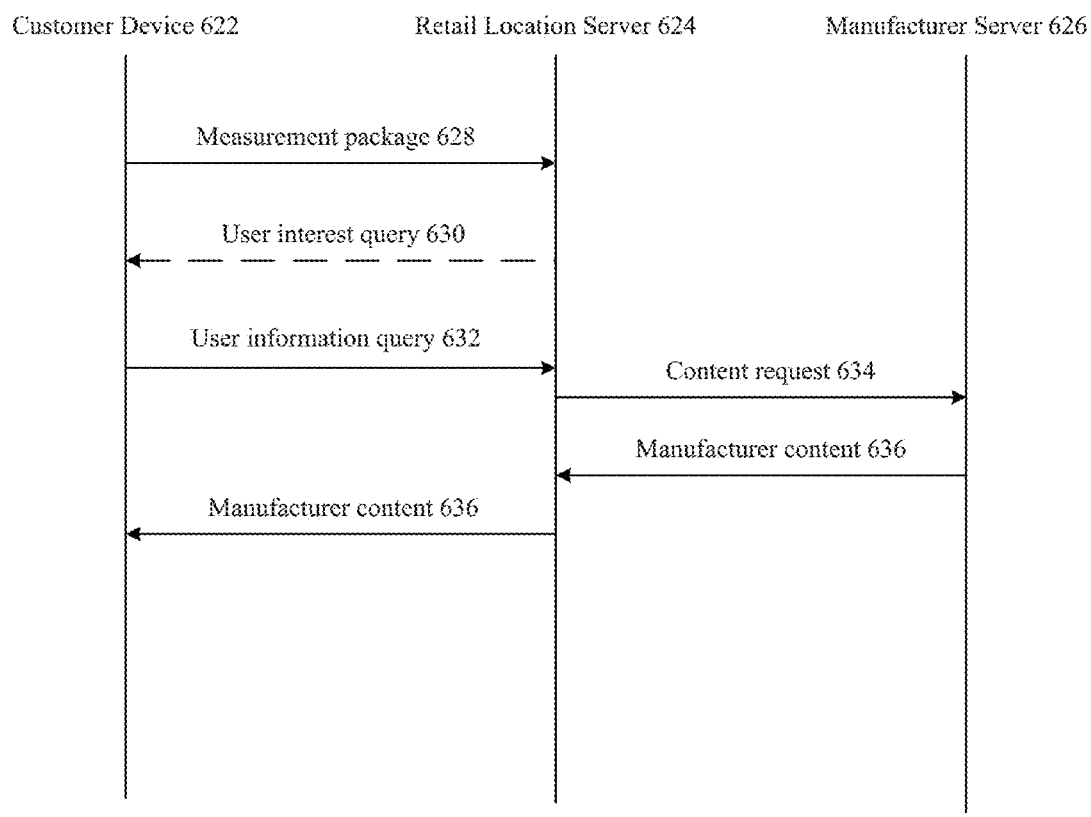
FIG. 6C is an exemplary process diagram depicting a manufacturer providing content associated with a predetermined area, according to an illustrative implementation.
Figure 6D:
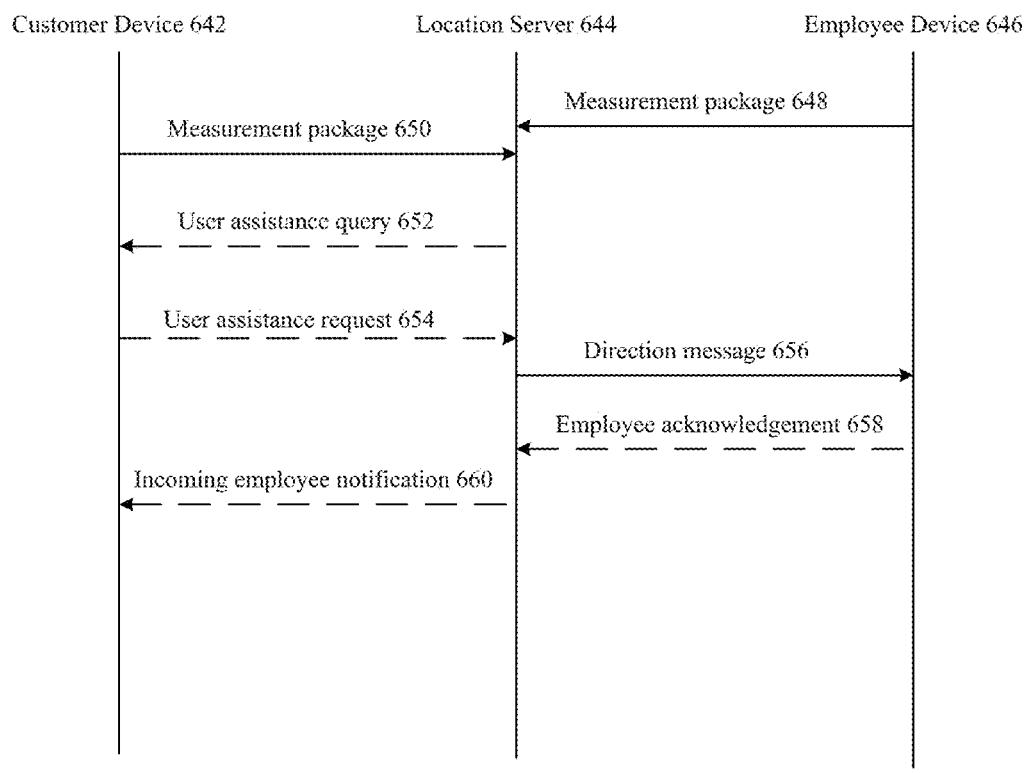
FIG. 6D is an exemplary process diagram depicting directing employees to an area, according to an illustrative implementation.

The systems and methods described herein relate to identifying whether a mobile device is located within a predetermined zone of an indoor area. FIGS. 1A-C provide an overview of a system classifying a mobile device as being in a zone, with FIG. 1A depicting an indoor area with signals that may be detected to determine whether a mobile device is located within a zone, FIG. 1B depicting the connection between a mobile device and a server that provides location services, and FIG. 1C illustrating how an indoor space may include predefined zones. FIG. 2A illustrates the components of a mobile device that may be classified as being in a predetermined zone, while FIG. 2B illustrates the components of a location server that may perform the classification. FIG. 3 depicts a computing device that may be used as a component of any of the systems described herein or as a computing device for performing any of the processes described herein. FIG. 4A depicts a process for identifying whether a mobile device is in an indoor area with predetermined zones. FIG. 4B depicts a process for classifying whether the mobile device is in one of the predetermined zones. FIG. 4C depicts a neural network that may be used by the process described in relation to FIG. 4B. FIG. 5A depicts a process for training a neural network such as that of FIG. 4C, while FIG. 5B depicts an indoor area with training sites that may be used to generate the training data used in the process described in relation to FIG. 5A. FIGS. 6A-D depict processes for providing content to a mobile device associated with a zone of an area, with FIG. 6A depicting a general content provision process, FIG. 6B depicting an exemplary process of a retailer providing content to a customer in a predetermined area, FIG. 6C depicting an exemplary process of a manufacturer providing content to a customer in a retail store, and FIG. 6D depicting an exemplary process of employees being directed to areas in which their services are needed.

General System Description

FIG. 1A is an illustrative block diagram of an indoor area 100 in which indoor location services may be provided. Indoor area 100 may be a store, a warehouse, a hospital, a factory, a library, a museum, a theater, or some other suitable indoor area. Indoor area 100 may include displays 102a-d (collectively, displays 102), which may include shelving with products for sale, advertisements, artwork, or some other suitable landmark. As depicted, mobile devices 104a-c (collectively, mobile devices 104) are located within indoor area 100. Mobile devices 104 may measure one or more signals 106a-d (collectively, signals 106), and are described in more detail in relation to FIG. 2A. Signals 106 may include radio frequency (RF) signals, sonic signals, infrared (IR) signals, ultraviolet (UV) signals, visual signals, magnetic fields, or other signals that can be used to identify a location. RF signals may include GPS signals, amplitude modulation (AM) or frequency modulation (FM) radio signals, cellular telephone base station signals, WI-FI signals, BLUETOOTH signals, or other suitable RF signals. The measurements of the one or more signals 106 may serve as a basis for identifying the location of the measuring mobile device 104, as described in relation to FIG. 4B.

FIG. 1B is an illustrative block diagram of an indoor location system 120. Mobile devices 104 provide measurement data via network 108 to location server 110. Network 108 may be a local area network (LAN), the Internet, or some other suitable computer network. The mobile devices may connect to network 108 using a WI-FI connection, a cellular data connection, or other suitable network connection. Location server 110, described in relation to FIG. 2B, may be connected to network 108 through a WI-FI connection, an Ethernet connection, or other suitable network connection, and receives measurement data generated by a mobile device 104 through network 108. Based on the received measurement data, location server 110 may identify whether the mobile device 104 is in a zone of indoor area 100, and may provide content to or request further measurement data from the mobile device 104 based on the identified zone.

FIG. 1C is an illustrative block diagram of an indoor area 100 in which an indoor locational service may classify a mobile device 104 as being in a predefined zone. Zones 112a-c (collectively, zones 112) are predefined regions of indoor area 100, and are associated with a set of measurement data by location server 110. If a mobile device 104 generates measurement data that falls within a range associated with a zone 112, location server 110 may identify the mobile device 104 as being within the zone 112 and provide the mobile device 104 with content associated with the zone 112. As an illustrative example, if display 102a is a collection of greeting cards on sale, location server 110 may provide mobile device 104a with greeting card coupons. As depicted, no mobile device 104 is within zone 112c: no mobile device 104 is generating measurement data within the range associated with zone 112c. In some implementations, zones 112 may differ in one or more of number, size, and shape from the depicted zones 112.

Indoor location system 120 identifies whether a mobile device 104 is within a zone 112 of indoor area 100, and, if so, which zone 112 the mobile device 104 is within. A mobile device 104 may measure those signals 106 detectable by the mobile device 104, and may transmit those measurements to location server 110 via network 108. Location server 110 identifies whether the measurements provided indicate that mobile device 104 is in a zone 112, and may provide content or commands associated with the zone 112 to the mobile device 104 if they do.

Locational Devices

FIG. 2A is an illustrative block diagram of a mobile locational device 200, which may act as a mobile device 104 of FIGS. 1A-C. A mobile locational device 200 may be a cellular phone, a smartphone, a tablet computer, or some other device capable of measuring available signals and transmitting measurements. The measurements generated may be used to identify the location of mobile locational device 200, and mobile locational device 200 may be provided with content or instructions based on its location. Mobile locational device 200 may measure GPS signals with GPS sensor 202, WI-FI signals with WI-FI antenna 204, BLUETOOTH signals with BLUETOOTH antenna 206, magnetic fields with magnetic sensor 208, audio signals with microphone 210, visual signals with camera 212, and cellular telephone signals with cellular antenna 214. These sensors and antennae may be collectively referred to as measurement units. In some implementations, a different number or variety of measurement units may be included, in some such implementations varying between two different mobile locational devices 200. As an illustrative example of such implementations, a first mobile locational device 200 may also include an infrared sensor, while a second may replace BLUETOOTH antenna 206 with an FM radio antenna. External location processor 216 may identify whether the mobile locational device 200 is in an area in which indoor location services are available by comparing the output of one or more measurement units to location database 218. In response to external location processor 216 determining that the mobile locational device 200 is in an indoor location service area, communications processor 220 may transmit measurement data associated with one or more measurement units to a location server 110 via network 108. Measurement data may include identification data stored in identification database 222. Mobile locational device 200 may connect to network 108 using WI-FI antenna 204, BLUETOOTH antenna 206, cellular antenna 214, or some other suitable connection. Content sent by locational server 110 in response to measurement data may be provided to a user through user interface (UI) 224.

GPS sensor 202 may be a receiver capable of receiving signals from navigational satellites, which may include satellites in the Global Positioning System, the Global Navigation Satellite System (GLONASS), or other satellite navigational systems. GPS sensor 202 may generate direct measurements of navigational satellite signals, processed location information derived from direct measurements of navigational satellite signals, or some combination thereof WI-FI antenna 204 may be a WI-FI or other wireless LAN adapter capable of sending and receiving data to a computer network via a wireless access point. In some implementations, WI-FI antenna 204 may connect mobile locational device 200 with network 108. WI-FI antenna 204 may be capable of characterizing more than one wireless network signal detectable in the same location. In some implementations, WI-FI antenna 204 may only be able to detect and characterize wireless LAN signals and not to transmit data.

BLUETOOTH antenna 206 may be a radio-frequency receiver and transmitter capable of sending and receiving data according to the BLUETOOTH wireless technology standard. In some implementations, BLUETOOTH antenna 204 may connect mobile locational device 200 with network 108. BLUETOOTH antenna 206 may be capable of characterizing more than one wireless network signal detectable in the same location. In some implementations, BLUETOOTH antenna 206 may only be able to detect and characterize BLUETOOTH signals and not to transmit data.

Magnetic sensor 208 may be a magnetoresistive device, a Hall effect magnetometer, or other suitable magnetic field measurement device. Magnetic sensor 208 may measure a strength of a magnetic field, a direction of a magnetic field, or both.

Microphone 210 may be a microphone used in a mobile telephone, and is capable of detecting and measuring audio signals. In some implementations, microphone 210 may detect and measure audio signals that are inaudible to humans, which may include sounds with frequencies outside the range of 20 to 20,000 Hz.

Camera 212 may be a digital camera capable of recording pictures or videos. In some implementations, camera 212 may be sensitive to IR light, visible light, UV light, or some combination thereof. In some implementations, camera 212 may be capable of generating signals identifying a Quick Response (QR) code or other suitable patterns. In some implementations, camera 212 may provide an ambient light intensity, an ambient light wavelength, or some combination thereof.

Cellular antenna 214 may be a receiver and transmitter of cellular telephone signals. In some implementations, cellular antenna 214 may connect mobile locational device 200 with network 108. In some implementations, cellular antenna 214 may only be able to detect and characterize cellular telephone signals and not to transmit data.

External location processor 216 may be a computer processor for identifying whether mobile locational device 200 is in an area in which indoor location services are available. External location processor 216 may compare one or more measurements to criteria recorded in location database 218 to determine whether mobile locational device 200 should transmit measurement data to a location server 110. Such a comparison may include a direct comparison of signal measurements to criteria recorded in location database 218 or determining whether a geographical location identified from measurement data is within a range of values recorded in location database 218. In some implementations, external location processor 216 may also or alternatively identify whether mobile locational device 200 is in an indoor area by identifying a change in the audio signals measured by microphone 210, the visual signals measured by camera 212, the WI-FI signals detected by WI-FI antenna 204, the magnetic field detected by magnetic sensor 208, or some other predetermined signal change.

Location database 218 may be a computer-readable and -writable medium providing instructions regarding transmitting measurement data to a location server 110. The instructions stored in location database 218 may be recorded in response to instructions received from location server 110, and may be stored temporarily or until changed by location server 110. In some implementations, location database 218 may identify a first location server 110 associated with one indoor area and a second location server 110 associated with a second indoor area.

Communications processor 220 may be a computer processor for connecting to a location server 110 over network 108 in order to transmit data to and receive data from the location server 110. In some implementations, communications processor 220 may transmit and receive data using a secure network connection, such as a connection made using the Transport Layer Security (TLS) protocol. When external location processor 216 indicates that mobile locational device 200 is within a predetermined indoor area, communications processor 220 may transmit identification data from identification database 222 and measurement data from one or more measurement units to a location server 110 indicated by location database 218. In some implementations, communications processor 220 may contact a location server 110 in response to a location application being run on mobile locational device 200. Communications processor 220 may receive instructions from location server 110 regarding what measurement data to provide, when to provide the measurement data, or both. Communication processor 220 may record such instructions in location database 218. Communication processor 220 may also provide location server 110 one or more of a time at which a measurement was taken, a validity period for a measurement, an indication of the accuracy of a measurement, or other suitable information regarding one or more measurements generated by a measurement unit of the mobile locational device 200. Communications processor 220 may receive content from a location server 110 based on the measurement data provided, and may provide the content to a user through UI 224. In some implementations, communications processor 220 may also request data from a location server 110 in response to a user request made through UI 224.

Identification database 222 may be a computer-readable and -writable medium for storing information about the mobile locational device 200, the user of the mobile locational device 200, or other suitable identifying information. Information about the mobile locational device 200 may include the manufacturer of the device, the model, the operative firmware, a list of sensing capabilities, or other suitable information. Identifying information about the user of the mobile locational device 200 may include a username, an account history, a rewards balance, or other suitable information. In some implementations, a user of the mobile locational device 200 may choose to disable the transmission of a portion of the identification information stored in identification database 222.

UI 224 is an interface through which a user may access content associated with a location. UI 224 may be an application, such as a web browser or other suitable application, which is run by mobile locational device 200 and which displays content received from location server 110. UI 224 may generate and send location information, commands, or other suitable information to location device 110 in response to a condition, such as the mobile device being within a predetermined area, or in response to a predetermined action by a user, which may include selecting an icon with a cursor or on a touchscreen, selecting a menu option with a cursor or on a touchscreen, writing a text command, or other suitable action. Commands may include requests for content associated with a location, requests for assistance at a location, and other suitable commands.

External location processor 216 may compare outputs of measurement units such as GPS sensor 202 to criteria stored in location database 218 to determine whether a mobile locational device 200 is in an indoor area with classifiable zones. If so, communications processor transmits identifying information from identification database 222 to a location server 110 via network 108, and receives instructions regarding what measurement data to provide location server 110 and how frequently to provide it. Content provided by the location server 110 may be provided to a user via UI 224, and the user may also request data associated with a zone using UI 224.

FIG. 2B is an illustrative block diagram of a location server 230, which may act as a location server 110 of FIG. 1B. Location server 230 includes a communications port 232 connecting location server 230 to network 108. Communications processor 234 identifies and directs incoming and outgoing network traffic, including measurement packages transmitted by and content transmitted to mobile locational devices 200. Location data used to identify whether a mobile locational device 200 is in a predetermined zone is transmitted to location processor 236, which may identify whether the device 200 is in a zone based on rules stored in location database 238. The zone of the mobile locational device 200 as determined by location processor 236 is compared to zone content database 240 to determine what, if any, content or instructions should be transmitted to the device 200 based on its region, and location processor 236 transmits content or instructions to the device 200 accordingly. The rules stored in location database 238 may be based on raw training data provided by communications processor 234 to data pre-processing engine 242. As described in relation to FIG. 5A, raw training data consists of a measurement package that is known to be associated with a zone 112. Data pre-processing engine 242 may identify the zone 112 associated with an element of raw training data using information stored in training identification database 244 and divide the raw training data into a training data set and a test data set. Data pre-processing engine 242 may also store measurement packages from the raw training data and their associated zones in training database 246. The training data set is provided to neural network development engine 248, which may identify rules for classifying a mobile locational device 200 as being in one or another zone 112. Neural network test engine 250 uses the test data to determine the validity of the rules identified by neural network development engine 248.

The depicted communication ports 232 is a network port, and may include 100BASE-TX Ethernet ports, 1000BASE-T Ethernet ports, 10GBASE-T Ethernet ports, a WI-FI antenna, or other suitable network ports. Communication port 232 may transmit data received from network 108 to communications processor 234, and may transmit data to a mobile locational device 200 via network 108. In some implementations, there may be a different number of communication ports 232 than are depicted.

Communications processor 234 may be a computer processor for sending data to and receiving data from a mobile location device 200. Communications processor 234 may receive a measurement package from a mobile locational device 200, identify whether the measurement package is raw training data to be sent to data pre-processing engine 242 or location data to be transmitted to location processor 236, and transmit the measurement package accordingly. Communications processor 234 may further transmit instructions to a mobile locational device 200 regarding what to include in measurement packages sent by the device 200 and how often to send the packages, and may also or alternatively transmit content associated with the zone of the device 200. In some implementations, a service administrator may provide instructions to location server 230 via communications processor 234. As an illustrative example of such implementations, a service administrator may change the required accuracy for location identification, identify a new zone to be distinguished from the rest of an indoor area, or alter the content associated with a zone.

Location processor 236 may be a computer processor for identifying a zone in which mobile locational device 200 is located. Location processor 236 may identify the indoor area in which the mobile locational device 200 is located as described in relation to FIG. 4A, and may determine in which zone of the indoor area the device 200 is located based on measurement and identification data provided by the device 200 and according to rules recorded in location database 238. As described in relation to FIG. 4B, location processor 236 may identify whether a mobile locational device 200 is in a zone 112 by providing the measurement and identification data of the device 200 to a neural network. In some implementations, location processor 236 may instead classify device 200 as being in one or another zone based on a comparison of the measurement and identification data of the device 200 to a Bayesian model of the area or using some other suitable classification method. In response to classifying a device 200 as being in a zone, location processor 236 may take an action associated with the zone in accord with instructions recorded in zone content database 240. An action associated with a zone may include instructing communications processor 234 to transmit content or measurement instructions to the mobile location device 200. In some implementations, location processor 236 may also or alternatively record information regarding the classification of a mobile locational device 200, such as when and for how long a particular mobile locational device 200 was in a particular area.

Location database 238 may be a computer-readable and -writable medium providing rules for classifying a mobile locational device 200 as being located in a zone based on a measurement package, as described in relation to FIG. 4C. A measurement package may include identification data. The classification rules are generated by neural network development engine 248, and may in some implementations be revised over time. Location database 238 may record classification rules for more than one indoor area, in which case a single neural network may be associated with only one indoor area or with multiple indoor areas.

Zone content database 240 may be a computer-readable and -writable medium storing rules for providing content or instructions to a mobile locational device 200 located in a zone 112. A rule associated with a zone 112 may include providing content or instructions associated with the area. As an illustrative example of the former, if a mobile locational device 200 is identified as being near a T. rex fossil in a museum, zone content database 240 may indicate that a video featuring a rendering of the dinosaur should be provided to the device 200 if the device is of a type capable of displaying such a video. As an illustrative example of the latter, if a mobile locational device 200 is identified as being in a zone in which the location of mobile location device 200 may be classified based on cellular signal strength alone, zone content database 240 may indicate that mobile locational device 200 should save energy by only taking cellular signal measurements. In some implementations, zone content database 240 may indicate that other devices should be signaled in response to a mobile locational device 200 being within a zone 112. Illustrative examples of such implementations include instructing a third party to move to the designated area and increasing the output of an air conditioning unit based on the number of mobile locational devices 200 located within the designated area.

Data pre-processing engine 242 may be a computer processor for preparing raw training data for use in training a neural network and for providing content associated with a zone 112. Raw training data may be received from a mobile locational device 200 via communications processor 234. As described in relation to FIG. 5B, an element of raw training data is associated with a zone 112, includes a measurement package, and may include a request for content. Using information stored in training identification database 244, data pre-processing engine 242 may fulfill such requests for content via communications processor 234, and may identify with which zone 112 an element of raw training data is associated. The processed raw training data may be stored in training database 246, and may be divided into training data provided to neural network development engine 248 and test data provided to neural network test engine 250. The raw training data may be divided randomly or using some other appropriate scheme.

Training identification database 244 may be a computer-readable and -writable medium storing information identifying a zone 112 associated with an element of raw training data. As described in relation to FIG. 5B, an element of raw training data includes metadata or content indicating a zone 112 with which the raw training data is associated. Training identification database 244 may also store content that may be provided to a mobile locational device 200 in response to the device 200 providing an element of raw training data. In some implementations, a service administrator may alter training identification database 244, such as by changing zones, changing content associated with zones, or making some other suitable changes.

Training database 246 may be a computer-readable and -writable medium storing measurement packages and indicating each measurement package's associated location. Data stored in training database 246 may be used to train and test a location classifying neural network stored in location database 238. In some implementations, training data stored in training database 246 may be replaced with new training data based on the time elapsed since the replaced data was taken, whether the new training data was taken at a similar time of day or with a similar device as the replaced data, or some other suitable criteria.

Neural network development engine 248 may be a computer processor for training a neural network to classify measurement data. Neural network development engine 248 may provide measurement packages from the training data to an existing or randomly generated neural network and compare the resulting classifications with the zones identified in the training data. The neural network may then be adjusted to reduce the error rate, and the process repeated until a predetermined error rate is achieved, as described in relation to FIG. 5A. Neural network development engine 248 may use the backpropagation algorithm or some other suitable algorithm to train neural networks. In some implementations, some of the training data may be designated as validation data. In such implementations, the neural network's rate of errors in correctly classifying the validation data is examined as the neural network is trained, and if the error changes in a predetermined fashion the training may be stopped. In implementations in which a neural network is not used to classify measurement data, neural network development engine 248 may instead generate the model used to classify measurement data. In some implementations, the functions of neural network development engine 248 may be carried out by location processor 236.

Neural network test engine 250 may be a computer processor for testing a neural network trained by neural network development engine 248. Neural network test engine 250 receives test data from data pre-processing engine 242, and may determine the proportion of measurement packages in the test data that a neural network generated by neural network development engine 248 will classify correctly. If the proportion falls below a predetermined threshold, neural network test engine 250 may instruct neural network development engine 248 to replace the neural network, possibly with a neural network with a different number of nodes, and may also or alternatively instruct data pre-processing engine 242 to redistribute the raw training data into training data and test data. In implementations in which a neural network is not used to classify measurement data, neural network test engine 250 may instead test some other model used to classify measurement data. In some implementations, the functions of neural network test engine 250 may be carried out by location processor 236.

Location server 230 develops and implements rules for classifying a mobile locational device 200 as being in one or another zone of an indoor area. Rules are developed using raw training data from devices 200. Communications processor 234 receives the raw training data and forwards it to data pre-processing engine 242. Data pre-processing engine 242 identifies the zone 112 associated with each raw training data element and assigns each raw training data element to either neural network development engine 248, which uses the data to develop the zone classification rules, or to neural network test engine 250, which uses the data to test the developed rules. Rules meeting predefined criteria are saved in location database 238, where they are used by location processor 236 to classify location data from a mobile locational device 200. In response to classifying the device 200 as being in a zone 112, location processor 236 implements one or more rules associated with the zone 112 and stored in zone content database 240.

Computing Device

FIG. 3 is a block diagram of a computing device that can be used to implement or support the any of the components of the system of FIGS. 1B or 2, and for performing any of the processes described herein. Location server 230 may be implemented on one or more computing devices 300 having suitable circuitry, and mobile locational device 200 may communicate with location server 230 through one or more computing devices 300 having suitable circuitry. In certain aspects, a plurality of the components of system 120 may be included within one computing device 300. In certain implementations, a component and a storage device may be implemented across several computing devices 300.

The computing device 300 comprises at least one communications interface unit, an input/output controller 310, system memory, and one or more data storage devices. This can support a network connection such as a connection to network 108 in FIG. 1B. The system memory includes at least one random access memory (RAM 302) and at least one read-only memory (ROM 304). The memory 304 can support the location database 238 of FIG. 2B, for example. All of these elements are in communication with a central processing unit (CPU 306) to facilitate the operation of the computing device 300. The computing device 300 may be configured in many different ways. For example, the computing device 300 may be a conventional standalone computer or alternatively, the functions of computing device 300 may be distributed across multiple computer systems and architectures. In FIG. 3, the computing device 300 may be linked, via network or local network, to other servers or systems.

The computing device 300 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 308 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 306 comprises a processor, such as one or more conventional microprocessors and one or more supplementary co-processors such as math co-processors for offloading workload from the CPU 306. CPU 306 The CPU 306 is in communication with the communications interface unit 308 and the input/output controller 310, through which the CPU 306 communicates with other devices such as other servers, user terminals, or devices. The communications interface unit 308 and the input/output controller 310 may include multiple communication channels for simultaneous communication with, for example, other processors, servers or client terminals.

The CPU 306 is also in communication with the data storage device. The data storage device may comprise an appropriate combination of magnetic, optical or semiconductor memory, and may include, for example, RAM 302, ROM 304, flash drive, an optical disc such as a compact disc or a hard disk or drive. The CPU 306 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 306 may be connected to the data storage device via the communications interface unit 308. The CPU 306 may be configured to perform one or more particular processing functions.

The data storage device may store, for example, (i) an operating system 312 for the computing device 300; (ii) one or more applications 314 (e.g., computer program code or a computer program product) adapted to direct the CPU 306 in accordance with the systems and methods described here, and particularly in accordance with the processes described in detail with regard to the CPU 306; or (iii) database(s) 316 adapted to store information that may be utilized to store information required by the program. The depicted database 316 can be any suitable database system, including the commercially available Microsoft Access database, and can be a local or distributed database system. The design and development of suitable database systems are described in McGovern et al., A Guide To Sybase and SQL Server, Addison-Wesley (1993).

The operating system 312 and applications 314 may be stored, for example, in a compressed, an uncompiled and an encrypted format, and may include computer program code. The instructions of the program may be read into a main memory of the processor from a computer-readable medium other than the data storage device, such as from the ROM 304 or from the RAM 302. While execution of sequences of instructions in the program causes the CPU 306 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to providing content to an audience as described herein. The program also may include program elements such as an operating system 312, a database management system and "device drivers" that allow the processor to interface with computer peripheral devices (e.g., a video display, a keyboard, a computer mouse, etc.) via the input/output controller 310.

The term "computer-readable medium" as used herein refers to any non-transitory medium that provides or participates in providing instructions to the processor of the computing device 300 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 306 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 300 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

As discussed above, a function relating to identifying a location can be realized as a software component operating on a conventional data processing system such as a Unix workstation. In that implementation, the function can be implemented as a C language computer program, or a computer program written in any high level language including C++, Fortran, Java or BASIC. See The C++ Programming Language, 2nd Ed., Stroustrup Addison-Wesley. Additionally, in an implementation where microcontrollers or DSPs are employed, the function relating to identifying a location can be realized as a computer program written in microcode or written in a high level language and compiled down to microcode that can be executed on the platform employed. The development of such network traffic control systems is known to those of skill in the art, and such techniques are set forth in Digital Signal Processing Applications with the TMS320 Family, Volumes I, II, and III, Texas Instruments (1990). Additionally, general techniques for high level programming are known, and set forth in, for example, Stephen G. Kochan, Programming in C, Hayden Publishing. Developing code for the DSP and microcontroller systems follows from principles well known in the art.

Some implementations of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some implementations may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some implementations include a computer program product comprising a computer readable medium (media) having instructions stored thereon/in and, when executed (e.g., by a processor), perform methods, techniques, or implementations described herein, the computer readable medium comprising sets of instructions for performing various steps of the methods, techniques, or implementations described herein. The computer readable medium may comprise a storage medium having instructions stored thereon/in which may be used to control, or cause, a computer to perform any of the processes of an implementation. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some implementations different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some implementations include software instructions for controlling both the hardware of the general purpose or specialized computer or microprocessor, and for enabling the computer or microprocessor to interact with a human user and/or other mechanism using the results of an implementation. Such software may include without limitation device drivers, operating systems, and user applications. Ultimately, such computer readable media further includes software instructions for performing implementations described herein. Included in the programming (software) of the general-purpose/specialized computer or microprocessor are software modules for implementing some implementations.

Indoor Location Identification

FIG. 4A is an illustrative flow chart of general location identification process 400. Referring to FIG. 2A, general location identification process 400 determines whether a mobile locational device 200 is in an indoor area like that depicted in FIG. 1C. If so, general location identification process 400 calls upon indoor location identification process 410, as described in relation to FIG. 4B, to determine the zone in which the mobile locational device 200 is located.

General location identification process 400 begins when a location identification application is run by a mobile locational device 200 in step 401. In some implementations, the location identification application may be a background application without a user interface. Step 402 determines whether a predetermined set of measurement data falls within a predetermined range. As an illustrative example, external location processor 216 may determine whether the output of GPS receiver 202 is within a predetermined range of a building in which indoor location services are available. Step 402 may be repeated until the mobile locational device 200 is within an appropriate area. Once it is, mobile locational device 200 may transmit a signal identifying its type to a location server 230 in step 403. Location server 230 may then implement indoor location identification process 410. Step 404 determines whether the mobile locational device 200 is still within the predetermined range of step 402. Step 404 may be prompted by measurements taken during indoor location identification process 410 or may occur in parallel with indoor location process 410, whether through continuous measurements or measurements taken at periodic intervals. If step 404 indicates that the mobile locational device 200 is still within the predetermined range, indoor location identification process 410 may continue. Otherwise, in step 405 the mobile locational device stops taking the data required by indoor location identification process 410 and returns to step 402. General location identification process 400 may continue while the location application is running.

FIG. 4B is an illustrative flow chart of indoor location identification process 410. Referring to FIG. 1C, process 410 may identify whether a mobile device 104 is within a zone 112. Process 410 may begin when general location identification process 400 identifies that a mobile device 104 is within an area for which indoor location services are available. In step 411, location server 110 instructs mobile device 104 to provide predefined measurement packages at predetermined intervals. The contents of the predefined measurement package may be based on identification information provided by mobile device 104, and may include one or more of a geographic location estimated by an operating system of the mobile device 104, raw GPS measurements, magnetic field strength and direction measurements, the names and signal strengths of detectable WI-FI networks, the names and signal strengths of detectable BLUETOOTH devices, measurements of the strength and frequency of audio signals, the wavelength and intensity of ambient light, still camera images, video camera footage, the results of signal detection algorithms run on audio or video, or other suitable data. The length of the predetermined intervals may be based on the identification information of the mobile device 104, the area in which location services are being provided, or other suitable criteria, and may vary from measurement packages being provided as often as possible to being provided less than once an hour.

In step 412, location server 110 receives a measurement package from a mobile device 104. The measurement package may be provided to a neural network as described in relation to FIG. 4C, and may include information regarding the type of the mobile device 104 indicated in general location identification process 400. Step 413 identifies the output of the neural network in response to the input of the measurement package. As described in relation to FIG. 4C, the output of the neural network may classify whether the mobile device 104 is in a predefined zone of an indoor area, which zone the mobile device 104 is in if so, and whether a different amount of measurement data is needed. In step 414, location server 110 may take an action associated with the zone 112 indicated by the neural network, which may include sending content to the mobile device 104, changing the measurements included in the predefined measurement packages, changing the interval between measurement packages, recording the time at which the mobile device 104 was in an identified zone, continuing to implement process 410, or some other suitable action. In step 415, location server 110 may determine whether the mobile device 104 is still in the general indoor area identified in general location process 400. If so, process 410 returns to step 412; otherwise, process 410 ends.

FIG. 4C depicts an exemplary neural network 420 for classifying an indoor location, such as the neural networks mentioned in relation to FIGS. 2B and 4B. Neural network 420 takes measurements 422*a-f* (collectively, measurements 422) as inputs for nodes 424*a-f* (collectively, nodes 424). Nodes 424 are inputs for hidden nodes 426*a-f*, which are themselves inputs for hidden nodes 426*g-k*. Hidden nodes 426*g-k* are inputs for outputs 428*a-d* (collectively, outputs 428). Thus, neural network 420 generates outputs 428 in response to receiving a set of measurements 422.

Referring to FIG. 2A, a measurement 422 may include the type of mobile locational device 200 generating measurements 422, a geographic location estimated by external location processor 216, raw GPS measurements from GPS sensor 202, a signal strength of a predetermined WI-FI network as detected by WI-FI antenna 204, the signal strength of a predetermined BLUETOOTH device as detected by BLUETOOTH antenna 206, magnetic field strength and direction measurements from magnetic sensor 208, measurements of the strength and frequency of audio signals from microphone 210, the wavelength and intensity of ambient light detected by camera 212, or other suitable data. In some implementations, there may be a different number of measurements 422 than are here depicted. In some implementations, more than one measurement 422 may be related to the same type of measurement unit of mobile locational device 200. As an illustrative example of such implementations, measurement 422*c* may be the strength of a WI-FI signal "A," and measurement 422*d* may be the strength of a WI-FI signal "B." Each node 424 is a function of an associated measurement 422, and may equal its associated measurement 422. In some implementations, a node 424 may be a function of more than one measurement 422, such as of both the signal strength of a WI-FI network and whether the mobile locational device 200 is of a particular type. In some implementations, there may be a different number of nodes 424 than are here depicted.

Hidden nodes 426*a-k*, collectively hidden nodes 426, are functions of the nodes to which they are connected to their left on neural network 420. For example, hidden node 426*c* is a function of nodes 424*a-f*, and hidden node 426*h* is a function of hidden nodes 426*a-f*. In some implementations, there may be a different number of hidden nodes 426 than are depicted. A hidden node 426 may be a function of a weighted sum of its input nodes, where each input node may have a different weight on the output of the hidden node 426. The weights may be altered during network node training, as described in relation to FIG. 5A. The function of a hidden node 426 may generate one of a finite set of numbers based on the input, such as equaling −1 when the weighted sum is smaller than a first predetermined value, zero when the weighted sum is greater than the first predetermined value but less than a second predetermined value, and one when the weighted sum is larger than the second predetermined value. In some implementations, the function of a hidden node 426 may generate a number from a continuous set of numbers.

An output 428 is a classification of the measurement package that was input as measurements 422, and thus is a classification of the mobile locational device 200 that generated the measurement package. Referring to FIG. 1C, output 428a may represent whether the mobile locational device 200 is in zone 112a, while output 428b may represent whether the mobile locational device 200 is in zone 112b. An output 428 may indicate that a mobile locational device 200 is not in a zone of interest. In some implementations, an output 428 may indicate that a different neural network should be used for classifying the location of the mobile locational device 200. In such implementations, output 428 may indicate that the mobile locational device 200 should take a different amount of data, which may include taking less data to save energy or more data to more precisely classify the location of mobile locational device 200. In some implementations, there may be a different number of outputs 428 than are depicted.

Neural Network Training

FIG. 5A is an illustrative block diagram depicting a training process 500 for training a neural network to identify a zone of an indoor area based on available measurement data, according to an illustrative implementation. Referring to FIG. 2B, process 500 may be implemented by a location server 230, and a neural network trained by process 500 may be used to classify locations as depicted in FIG. 4B. Training process 500 begins with step 501, which provides one or more training sites, physical locations associated with pre-defined zones of an indoor area. Training sites are described in more detail with respect to FIG. 5B. In step 502, communications processor 234 receives measurement packages associated with content or metadata identifying a training site. The associated content or metadata identifies the data as training data, so the training data is forwarded to data pre-processing engine 242. In step 503, data pre-processing engine 242 identifies the zone associated with each training measurement package from the content or metadata associated with the measurement package. Step 503 thereby associates each measurement package with a zone. In step 504, data pre-processing engine 242 divides the set of raw training measurement packages into training and test data sets. The division may be performed randomly, by the order in which the raw training data was received, or by some other suitable criteria.

With the raw training data processed and divided, neural network development engine 248 performs step 505. Step 505 compares a neural network's output for each measurement package in the training data to the zone associated with the measurement package. The neural network of step 505 may be an existing neural network. If a new neural network is being created, its number of nodes may be a predetermined function of the varieties of input data and the number of zones to be classified, and the relationship between two nodes may have a weight randomly assigned within predetermined boundaries. Using the backpropagation algorithm or some other suitable algorithm, neural network development engine 248 may adjust the weights of the neural network so that the neural network correctly classifies at least a predetermined proportion of measurement packages as being associated with their zones. Step 505 may repeat for a predetermined number of iterations, until the proportion of misclassified measurement packages falls below a predetermined number, or for some other suitable period. In some implementations, data pre-processing engine 242 may also classify some raw training data as validation data, and monitor the proportion of incorrect classifications of validation data measurement packages by the neural network. In such implementations, as the network is trained, if the proportion of errors in the validation data increases for a predetermined number of iterations of step 505, the neural network weights may be restored to their values when the validation error was at a minimum.

Step 506 then determines the error rate of the neural network in classifying measurement packages from the test data. If the neural network has an error rate above a predetermined threshold when classifying the test data set, process 500 may proceed to step 507, which may increase the number of hidden neurons in the neural network and return to step 505. Otherwise, step 508 records the neural network for use in location identification process 410.

In some implementations, one or more of steps 504-507 may be implemented using the "Neural Network Toolbox" implemented in MATLAB™ or by some other suitable implementation of a neural network training process. In some implementations, process 500 may be repeated when a predetermined amount of new raw training data is available, at predetermined intervals, on command by a system administrator, or in response to some other suitable criteria.

In some implementations, the process 500 may be used to generate more than one neural network for a single indoor area. As an illustrative example of such implementations, the process 500 may generate two neural networks, the first using fewer data inputs, the second using a larger number of data inputs. On the basis of the fewer data inputs, the first neural network can classify a mobile device 104 as being in first zone 112 or in a set of zones 112. If the first neural network classifies the mobile as being in the set of zones 112, classification of the position of mobile device 104 may be performed by the second neural network. The second neural network may classify a mobile device 104 as being in a zone 112, or may classify the mobile device 104 as being in the first zone 112, in which case the location of mobile device 104 may be classified using the first neural network.

FIG. 5B is an illustrative block diagram of an indoor area 520 with training sites to generate training data for a location classifying neural network. As depicted, indoor area 520 includes displays 522a-c (collectively, displays 522), areas of potential interest in indoor area 520 such as exhibits, shelves containing products for sale, or other suitable locations. Indoor area also includes location kiosks 524a-c, collectively location kiosks 524. Referring to FIG. 1C, a location kiosk 524 is associated with a zone 112, and may be a poster attached to a display 522, a freestanding display, an audio signal, or some other object offering content to users who perform some predetermined action with a mobile device 104. As an illustrative example, a location kiosk 524 may present a visual display indicating that a user who scans a Quick Response (QR) code, who texts a designated message to a designated phone number, or who uploads a photo of the kiosk using a mobile application will be provided with a coupon or with information about a display. Performing the predetermined action causes the mobile device 104 to send both a measurement package and an indication of the zone 112 associated with the measurement package to a location server 110. The indication of the zone 112 may be a request for a particular file, an address of the request, or some other suitable indication.

Location kiosks 524a and b thus encourage users to generate training data 526a, while location kiosk 524c encourages users to generate training data 526b. Training data 526a may be associated with a first zone and training data 526b with a second zone. Location server 110 may transmit the content associated with a location kiosk 524 to a mobile device 104 generating training data associated with the location kiosk 524, so the user receives desired content in exchange for generating training data for the location service. As depicted, training data for a region may be generated by a single location kiosk or by multiple location kiosks. In some implementations, one or more location kiosks 524 may be associated with locations outside of zones 112. In some implementations, location kiosks 524 may differ in number, distribution, or both from the location kiosks 524 here depicted.

Content Provision

FIG. 6A is an illustrative block diagram depicting a content provision process 600 for providing a mobile device with content associated with a zone. Referring to FIGS. 1C and 2B, location server 230 may provide content to a mobile device 104 within a predetermined zone 112. Process 600 begins with step 601, in which a mobile device 104 is identified as being within an indoor area 100, in some implementations through general location identification process 400. In step 602, location server 230 identifies content associated with indoor area 100, which may include content associated with one, more than one, or no zones 112. In step 603, location server 230 may track the location of the mobile device 104 within area 100 as described in relation to FIG. 4B. In step 604, the tracked location is compared with predetermined criteria for transmitting location-specific content. Criteria may include whether the mobile device 104 is in a zone 112, how long a mobile device 104 has been in a zone 112, the presence of a second mobile device 104 in a zone 112, the shopping or location history of a customer associated with mobile device 104, or some other suitable criteria. If the mobile device 104 meets the predetermined criteria, the location-specific content is transmitted to the mobile device 104, and content provision process 400 returns to step 603. Otherwise, step 606 determines whether the mobile device 104 is still within the predetermined area. If so, process 600 returns to step 603; otherwise, process 600 is complete.

FIG. 6B is an exemplary process diagram of retailer content provision process 610, in which a customer is provided with location-specific content. A customer device 612, such as mobile locational device 200 of FIG. 2A, is in communication with a retail location server 614, such as location server 230 of FIG. 2B. In accord with content provision process 600, customer device 612 transmits a measurement package 616 to retail location server 614. As depicted, retail location server 614 identifies that measurement package 616 is associated with a zone 112, and further identifies content that should be transmitted to a mobile device in zone 112. Retail location server 614 therefore sends location-specific content 618 to customer device 612. In some implementations, location-specific content 618 may not be related to the zone 112 in which the customer device 612 is located. As an illustrative example of such implementations, retail location server 614 may send a coupon to a customer to encourage the customer to move from one region of the store to another. In such implementations, the provision of location-specific content may be based on a customer purchase history, on the actions of previous users, or on some other suitable criteria.

FIG. 6C is an exemplary process diagram depicting a manufacturer content provision process 620, in which a manufacturer provides content associated with a predetermined area. As depicted, a customer device 622, such as mobile locational device 200 of FIG. 2A, is in communication with a retail location server 624, such as location server 230 of FIG. 2B. Retail location server 624, in turn, is in communication with a manufacturer server 626. In accord with content provision process 600, customer device 622 transmits a measurement package 628 to retail location server 624. As depicted, retail location server 624 identifies that measurement package 628 is associated with a zone 112, and may identify and transmit a user interest query 630 associated with the zone 112. As an illustrative example, if customer device 622 is in a zone 112 associated with paint, retail location server 624 may transmit content asking if the customer using customer device 622 has any questions regarding one of the paints. As depicted, customer device 622 transmits user information query 632 regardless of whether retail location server 624 has transmitted a user interest query 630. User information query 632 may be a selected from a menu of options, or may be user-generated and include text, an image, audio, video, or other suitable content. As an illustrative example of the former, a customer may be given the option of requesting more information about one or more manufacturers' products in zone 112. As an illustrative example of the latter, a customer may transmit a photo of a can of paint and text asking "how would this paint look under natural light?"

Retail location server 624 may identify the information requested by the customer and request the identified information from manufacturer server 626 with content request 624. In some implementations, user information query 632 may be directly forwarded to manufacturer server 626, which would then identify the information requested by the customer. In some implementations, retail location server 624 may also or alternatively send location or other data associated with customer device 622 to manufacturer server 626 if granted permission to do so by the user of customer device 622. Manufacturer server 626 may respond to content request 634 by identifying and transmitting manufacturer content 636 to retail location server 624. Manufacturer content 636 may include text, images, audio, or video providing information about one or more products associated with zone 112. Manufacturer content 636 may also or alternatively include coupons for one or more such products. Retail location server 624 may transmit manufacturer content 636 to customer device 622 in a form appropriate for customer device 622. In some implementations, retail location server 624 may also remove extraneous content from manufacturer content 636 before forwarding content 636. As an illustrative example of such implementations, if some manufacturer content 636 relates to products not carried by the retailer, retail location server 624 may not transmit such manufacturer content 636.

FIG. 6D is an exemplary process diagram depicting an employee provision process 640, in which employees are directed to a zone. As depicted, a customer device 642 and an employee device 646, each of which may be a mobile locational device 200 of FIG. 2A, are in communication with a location server 644, such as location server 230 of FIG. 2B. In accord with content provision process 600, customer device 642 and employee device 646 each transmit a measurement package, respectively measurement packages 650 and 648, to location server 644. As depicted, location server 644 identifies that measurement package 650 is associated with a zone 112 and that measurement package 648 is not. Location server 644 may transmit a user assistance query 652 to the customer device 642, and customer device 642 may transmit a user assistance request 654 to location server 644, whether independently or in response to a user assistance query 652. Location server 644 may transmit a direction message 656 to employee device 646, whether in response to receiving a user assistance request 654, to identifying that a customer device 642 has spent at least a predetermined amount of time in a zone 112, to identifying at least a predetermined number of customer devices 642 in a zone 112, or based on some other suitable criteria. Thus, location server 644 may identify where an employee is needed and direct the employee to the associated zone 112. An employee may transmit an employee acknowledgement 658 to indicate that he or she is heading to the zone indicated in direction message 656. In some implementations, other employees may be informed of the transmission of an employee acknowledgement 658, preventing multiple employees from unnecessarily traveling to the same zone. Location server 644 may respond to an employee acknowledgement 658 by transmitting an incoming employee notification 660 to customer device 642, which may indicate that an employee is coming to help, which employee is coming to help, or other suitable information. Thus, employee provision process 640 may allow a customer to request that an employee provide assistance, may automatically direct more employees to run cash registers if there are a large number of customers waiting in a payment area or wait times are becoming excessive, or otherwise identify how employees should be distributed in an area. In some implementations, process 640 may be adapted for use in non-retail settings, such as by providing machinery with a customer device 642 programmed to request help from a maintenance worker when one or more predetermined criteria are met.

Alternative Implementations

While various implementations of the present disclosure have been shown and described herein, it will be obvious to those skilled in the art that such implementations are provided by way of example only. Numerous variations, changes, and substitutions will now occur to those skilled in the art without departing from the disclosure. For example, a mobile device may provide measurement packages without attempting to determine whether it is in an indoor area in which indoor location services are available, data from internal inertial sensors of a mobile device may be used to aid classification of the location of the mobile device, or Bayesian models may be used instead of neural networks to classify locations. As another example, mobile devices may be further configured to detect dangerous conditions, such as by detecting loud sounds, and provide such information to a location server with a measurement package. In such an example, the location server may direct safety personnel to address the safety concern while warning others in the zone or in other designated zones of the danger. It should be understood that various alternatives to the implementations of the disclosure described herein may be employed in practicing the disclosure. An implementation of the systems and methods described herein may be made independently of or combined with another implementation.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

We claim:

1. An indoor location identification system, comprising:
    a communications processor configured to:
        receive a measurement from a mobile device in an indoor area, and
        receive a signal identifying a type of the mobile device;
    a location database for storing information associating, base on the identified type, each zone of a plurality of zones with a respective corresponding measurement range of a plurality of measurement ranges, wherein the plurality of zones is associated with the indoor area; and
    a location processor in communication with the communications processor and the location database, wherein the location processor is configured to:
        identify the indoor area,
        determine that the measurement falls within an identified measurement range of the respective corresponding measurement ranges, and
        identify a zone in which the mobile device is located based on:
            the measurement received from the mobile device,
            the information associating the zone with the corresponding measurement range, wherein the zone is one of the plurality of zones, and
        determine that the zone is associated with the identified measurement range.

2. The system of claim 1, wherein:
    the communication processor is further configured to receive a plurality of test measurement packages, wherein a test measurement package identifies a zone of the plurality of zones and a measurement; and
    the location processor is further configured to modify the information stored in the location database based on the plurality of measurement packages.

3. The system of claim 2, wherein a test measurement package is a measurement associated with a zone-specific code.

4. The system of claim 2, wherein the information associating each zone of the plurality of zones with the corresponding measurement range of the plurality of measurement ranges is a neural network.

5. The system of claim 2, wherein the information associating each zone of the plurality of zones with the corresponding measurement range of the plurality of measurement ranges is a Bayesian classifier.

6. The system of claim 1, wherein the communication processor is further configured to provide content to the mobile device based on the zone in which the mobile device is located.

7. The system of claim 1, wherein the location processor is further configured to identify the indoor area based on a Global Positioning System (GPS) measurement.

8. The system of claim 1, wherein the location processor is further configured to identify the indoor area based on a cellular tower signal.

9. The system of claim 1, wherein the location processor is further configured to identify the indoor area based on an application run by the mobile device.

10. The system of claim 1, wherein the communication processor is further configured to transmit a location request to the mobile device, and wherein the location processor is further configured to identify the indoor area based on a response to the location request.

11. The system of claim 1, wherein the measurement includes a Global Positioning System (GPS) measurement.

12. The system of claim 1, wherein the measurement includes a BLUETOOTH signal strength.

13. The system of claim 1, wherein the measurement includes a WI-FI signal strength.

14. The system of claim 1, wherein the measurement includes a cellular tower signal strength.

15. The system of claim 1, wherein the measurement includes a local magnetic field strength.

16. The system of claim 1, wherein the measurement includes a local magnetic field direction.

17. The system of claim 1, wherein the measurement includes an ambient light intensity.

18. The system of claim 1, wherein the measurement includes an intensity of sound of a predetermined frequency.

19. The system of claim 1, wherein the measurement includes a time.

20. The system of claim 1, wherein the measurement includes at least two of a Global Positioning System (GPS) measurement, a BLUETOOTH signal strength, a WI-FI signal strength, a cellular tower signal strength, a local magnetic field strength, a local magnetic field direction, an ambient light intensity, an intensity of sound of a predetermined frequency, and a time.

21. A computer-implemented method for identifying an indoor location of a mobile device in an indoor area, comprising:
  receiving, at a communications processor and from the mobile device in the indoor area, a measurement;
  receiving a signal identifying a type of the mobile device;
  storing, in a location database, information associating, based on the identified type, each zone of a plurality of zones with a corresponding measurement range of a plurality of measurement ranges, wherein the plurality of zones is associated with the indoor area;
  identifying, by a location processor in communication with the communications processor and the location database, the indoor area;
  determining that the measurement falls within an identified measurement range of the respective corresponding measurement ranges; and
  identifying a zone in which the mobile device is located based on:
    the measurement,
    the information associating the zone with the corresponding measurement range, wherein the zone is one of the plurality of zones, and
    determining that the zone is associated with the identified measurement range.

22. The method of claim 21, further comprising:
  receiving a plurality of test measurement packages, wherein a test measurement package identifies a zone of the plurality of zones and a measurement; and
  modifying a model associating each zone of the plurality of zones with a corresponding measurement range,
    wherein each corresponding measurement range is based on the plurality of test measurement packages, and
    wherein the zone in which the mobile device is located is identified based on the model.

23. The method of claim 22, wherein a test measurement package is a measurement associated with a zone-specific code.

24. The method of claim 22, wherein the model is a neural network.

25. The method of claim 22, wherein the model is a Bayesian classifier.

26. The method of claim 21, further comprising providing content to the mobile device based on the zone in which the mobile device is located.

27. The method of claim 21, wherein the indoor area is identified based on a Global Positioning System (GPS) measurement.

28. The method of claim 21, wherein the indoor area is identified based on a cellular tower signal.

29. The method of claim 21, wherein the indoor area is identified based on an application run by the mobile device.

30. The method of claim 21, further comprising transmitting a location request to the mobile device, wherein the indoor area is identified based on a response to the location request.

31. The method of claim 21, wherein the measurement includes a Global Positioning System (GPS) measurement.

32. The method of claim 21, wherein the measurement includes a BLUETOOTH signal strength.

33. The method of claim 21, wherein the measurement includes a WI-FI signal strength.

34. The method of claim 21, wherein the measurement includes a cellular telephone signal strength.

35. The method of claim 21, wherein the measurement includes a local magnetic field strength.

36. The method of claim 21, wherein the measurement includes a local magnetic field direction.

37. The method of claim 21, wherein the measurement includes an ambient light intensity.

38. The method of claim 21, wherein the measurement includes an intensity of sound of a predetermined frequency.

39. The method of claim 21, wherein the measurement includes a time.

40. The method of claim 21, wherein the measurement includes at least two of a Global Positioning System (GPS) measurement, a BLUETOOTH signal strength, a WI-FI signal strength, a cellular tower signal strength, a local magnetic field strength, a local magnetic field direction, an ambient light intensity, an intensity of sound of a predetermined frequency, and a time.

* * * * *

UNITED STATES PATENT AND TRADEMARK OFFICE
CERTIFICATE OF CORRECTION

PATENT NO.        : 9,462,568 B2                                Page 1 of 1
APPLICATION NO.   : 14/209939
DATED             : October 4, 2016
INVENTOR(S)       : Krallman et al.

It is certified that error appears in the above-identified patent and that said Letters Patent is hereby corrected as shown below:

In the Specification

At Column 11, Line number 64, change "CPU 306 The CPU 306 is in" to -- The CPU 306 is in --.

At Column 20, Line number 10, delete "a".

Signed and Sealed this
Twenty-seventh Day of December, 2016

Michelle K. Lee
*Director of the United States Patent and Trademark Office*